March 15, 1955 W. H. P. POULIART ET AL 2,704,361

RECEIVING CIRCUIT ARRANGEMENT

Filed Feb. 19, 1954 2 Sheets-Sheet 1

Inventors
W. H. P. POULIART-
F. M. MICHIELS

By Robert Harding Jr.
Attorney

Inventors
W. H. P. POULIART
F. M. MICHIELS
By Robert Harding Jr.
Attorney

United States Patent Office 2,704,361

Patented Mar. 15, 1955

2,704,361

RECEIVING CIRCUIT ARRANGEMENT

Willy Hortense Prosper Pouliart and Franciscus Marcel Michiels, Antwerp, Belgium, assignors to International Standard Electric Corporation, New York, N. Y., a corporation of Delaware Application February 19, 1954, Serial No. 411,522

Claims priority, application Netherlands February 27, 1953

4 Claims. (Cl. 340—174)

The invention relates to a receiving circuit arrangement for an electrical waveform alternately exhibiting positive and negative variations about a predetermined level.

It has particularly in view an application to magnetic drum recording technique and more precisely a reading circuit arrangement therefor.

An object of the invention is to produce an accurate and relatively simple reading circuit.

A more particular object is to have a reading arrangement which is not affected by impurities in the nickel coating on the drum which might cause spurious signals. An arrangement is envisaged here in which a drum of nonmagnetic material has an outer coating of nickel.

In accordance with a feature of the invention, the receiving circuit arrangement comprises a first channel accepting only the positive variations and a second channel accepting only the negative variations, a storage circuit with a short time constant with respect to the minimum time duration of any positive or negative variation inserted serially in each of said channels, each storage circuit having a charging path and a discharging path, and means interconnecting the charging path of each storage circuit with the discharging path of the other and responsive to a variation at said charging path for causing the discharge of the other storage circuit.

The above mentioned and other objects and features of the invention will become more apparent and the invention itself will be best understood by referring to the following description of an embodiment taken in conjunction with the accompanying drawings in which.

Figure 3:
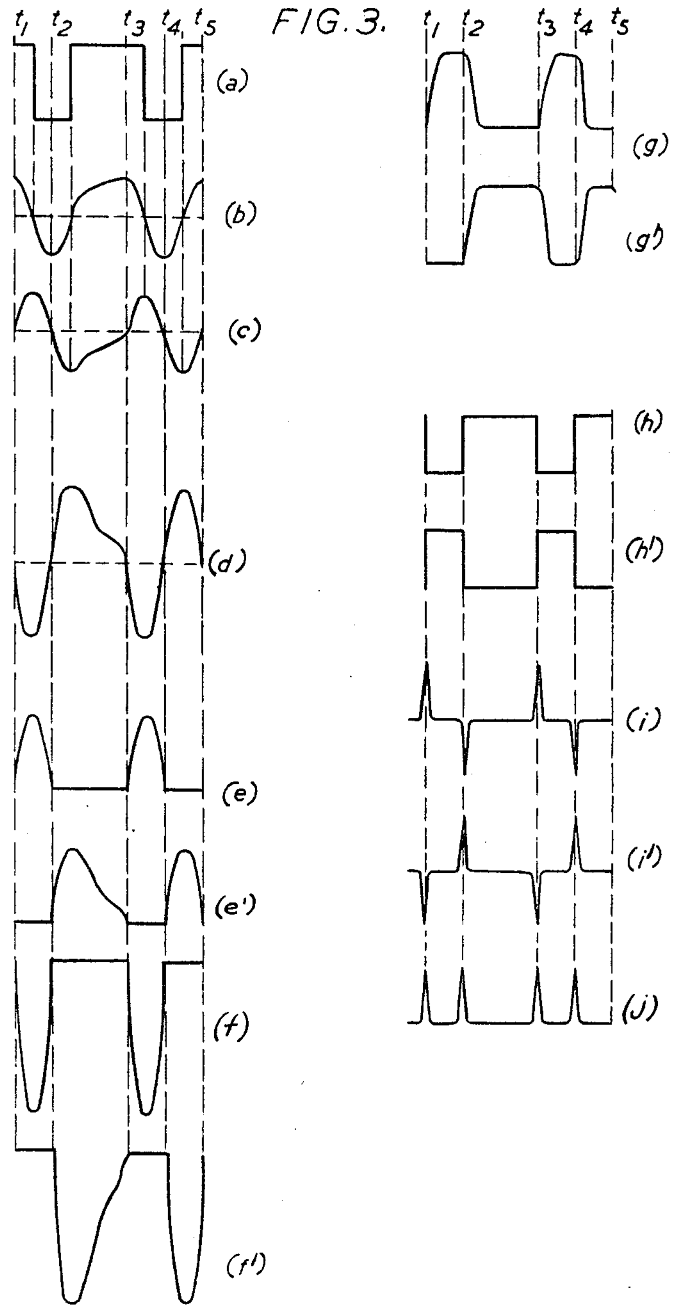
Fig. 3 shows various wave forms which appear at different points of the circuit shown in Fig. 1.

Various methods have already been employed for recording intelligence on magnetic drums by using at least two different states of magnetization of elemental areas of said drum as significant intelligence. Wave form (*a*) in Fig. 3 shows an example of recording wherein two senses of magnetization are used. It therefore represents the variations of the current in the storage coil.

Figure 4:
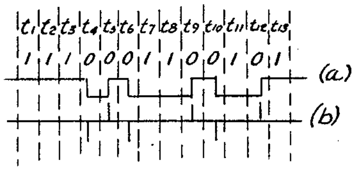

In accordance with a preferred scheme which has been disclosed in the copending patent application, Serial No. 411,523, filed February 19, 1954, for Method of Storing Electrical Intelligence, a change of current in the storage coil and accordingly a change in the sense of magnetization for the elemental length of track on the magnetic drum is used to represent one of the two binary digits, e. g. "0," while the absence of such a change characterizes the other binary digit, e. g. "1." In Fig. 4 a diagram is shown representing this scheme of changing the magnetization of elemental lengths of track in accordance with a binary number. The vertical dotted lines separate the individual time elements $t_1$ to $t_{13}$ which represent the time necessary for elemental lengths of track, each elemental length of track requiring one of the time elements for it to pass under the recording head. Immediately below the representation of the time elements is a binary number assumed to be recorded on the drum. At *a* the section of the magnetic track is indicated. As long as successive digits are 1 the elemental sections of track will be magnetized in the same sense, but whenever a digit having a value of 0 is reached, the corresponding elemental portion of track is magnetized in the opposite sense. Thus it will be seen that there is always a shift in the magnetization at each time representing a digit having a 0 value, while there is no shift at time elements representing digits having a value of 1. At *b* is shown a series of pulses which are derived from the curve of *a* during the reading off process. Each of these pulses whether positive or negative represents a 0 digit; the absence of a pulse during any time element will indicate a 1 digit. Thus the original information stored on the drum can be recovered.

The flux around the reproduction coil does not assume in practice the ideal form shown in Fig. 3 (*a*), but can be more correctly represented by a wave form having a shape, such as shown in (*b*) in the same figure. The electromotive force induced in the reproduction coil is proportional to the rate of change of the flux, and accordingly the sudden changes of magnetization on the nickel drum surface will, when passing under the reproduction head, produce voltage peaks in the reproduction coil. These voltage peaks constitute an extremely precise indication of the presence or the nature of a recorded signal and should therefore be used to produce an output wave form of the shape and nature suitable for use in circuits associated with the magnetic drum. However, any spurious signals are apt to mar the said maximum or minimum peaks and they make it very difficult to record these with suitable precision. In particular, any impurities on the magnetic drum surface are apt to cause such spurious signals.

Figure 1:
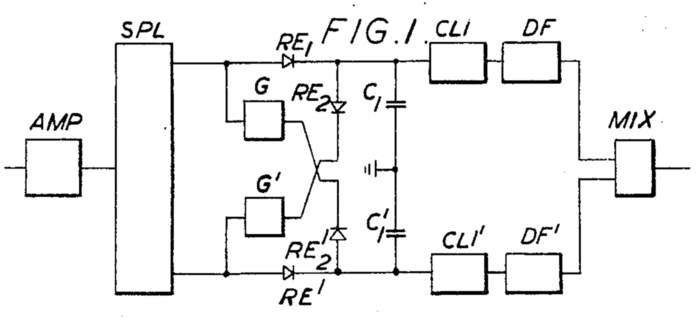
Fig. 1 is a block schematic of a receiving circuit arrangement.

The shape of the curve of the electromotive force induced in the reproduction coil is shown at (*c*) in Fig. 3, and for the part shown, it is seen to reverse at instants $t_1$, $t_2$, $t_3$, $t_4$ and $t_5$. This wave form may be assumed to be present at the input of the amplifier AMP, shown in Fig. 1.

If the said amplifier has an odd number of stages, the plate output will have the form indicated at (*d*) in Fig. 3 and it will be applied to a splitting arrangement SPL with two outputs, the upper one, leading to rectifier $RE_1$, producing a wave form, such as (*e*), and the lower one, leading to rectifier $RE'_1$, producing a wave form, such as (*e'*) in Fig. 3.

It should be realized that in passing from the wave form (*a*) in Fig. 3 which represents the original information, as it was stored on the magnetic drum, to the wave form shown by (*c*) in the same figure, there has been no distortion of information and the moments, such as $t_1$, where the electromotive force, shown at (*c*), changes its sign, are fully characteristic to reproduce the wave form shown by (*a*).

The upper output of circuit SPL delivers only the negative half waves, shown at (*d*), but reversed, as shown at (*e*), so that they become positive with respect to ground. At time $t_1$, a storage circuit comprising the condenser $C_1$, which is connected between the cathode of rectifier $RE_1$ and ground, will begin to charge, and as the charge time constant is very small, due to the low resistance value of $RE_1$, when conductive, the voltage across condenser $C_1$ will increase, as shown by (*g*). The voltage is seen to follow that provided at the input of rectifier $RE_1$ until such voltage starts to decrease, at which moment rectifier $RE_1$ becomes blocked causing, therefore, the voltage across condenser $C_1$ to remain stationary until time $t_2$. This assumes, of course, that any leakage path across the condenser at that moment is not important enough to cause any significant decrease until time $t_2$.

At this moment, the lower output of circuit SPL will emit a positive pulse having the shape shown at (*e'*), as it emits only the positive half waves of the wave form fed at its input and shown at (*d*). The application of this positive pulse to the device $G_1$ will cause the latter to change its output D. C. potential which was previously sufficiently high to prevent rectifier $RE_2$, connected at its output, from presenting a low resistance value. The first positive pulse shown at (*e'*) will, however, so lower the D. C. potential at the cathode of rectifier $RE_2$, that the latter, the anode of which is connected to the junction point between rectifier $RE_1$ and condenser $C_1$, will now afford a discharge path for the storage circuit comprising condenser $C_1$, whereby from time $t_2$, the voltage $C_1$ will quickly decrease back to ground level, as shown at (*g*). On the other hand, and in the same way, as described in relation to condenser $C_1$, at time $t_2$ the storage circuit comprising condenser $C'_1$ will have charged, due to the first positive pulse, shown at (*e'*). As soon as the pulse shown has reached its maximum positive value, the voltage across $C'_1$ will be stabilized to that value, since rectifier $RE'_1$ becomes blocked, and condenser $C'_1$ will not discharge until the device G provides a discharge path through rectifier $RE'_2$, similarly to the operation of the device G'. The voltage wave form across condenser $C'_1$ is shown at (*g'*).

The voltages across condensers $C_1$ and $C'_1$ will be respectively applied to the circuits CLI and CLI', which are essentially amplifying and clipping or slicing devices, whereby their respective output wave forms will have the shapes indicated at (*h*) and (*h'*). These are substantially ideal rectangular wave forms which are complementary, and the time intervals between successive changes of voltage levels accurately correspond to the time intervals between successive passages of the electromotive force shown at (*c*) through the zero value.

These pulses are thus characteristic of the original information, and they can then be respectively applied to differentiating devices, such as DF and DF', which will produce outputs, respectively shown at (*i*) and (*i'*). These two outputs will be fed to the circuit MIX which is essentially a mixing circuit but which suppresses the negative pulses. Therefore, its output will have the form indicated at (*j*), and the spacings between the successive trigger pulses are characteristic of the original information, since an ideal differentiated form of the wave, shown at (*a*), has been obtained.

Figure 2:
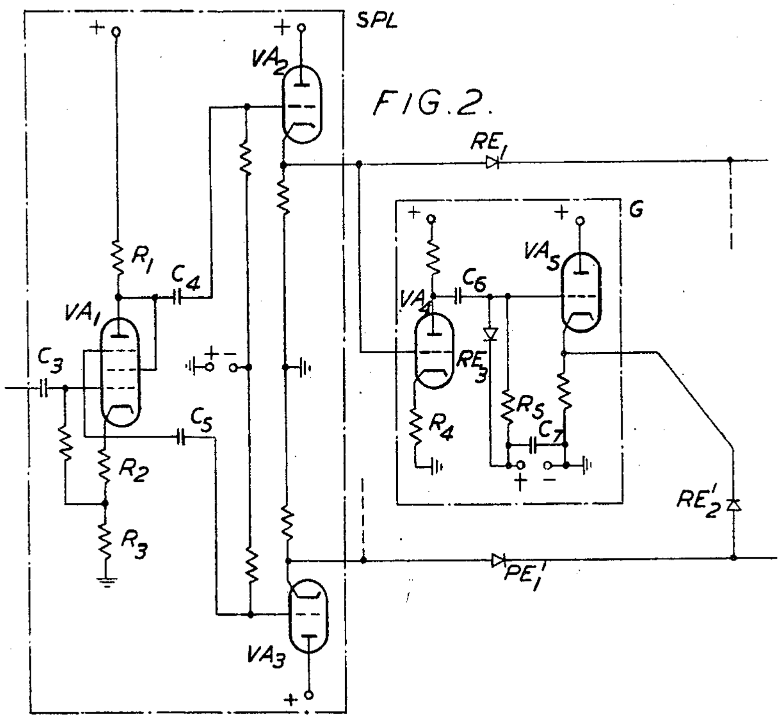
Fig. 2 is a detailed embodiment of two parts of the circuit shown in block schematic form in Fig. 1.

Fig. 2 shows detailed circuits for SPL and G. Circuit SPL is seen to comprise a pentode $VA_1$ which is arranged in a conventional manner as a push-pull phase splitter, the value of resistor $R_1$ being equal to the sum of the values of resistors $R_2$ and $R_3$, included in the cathode circuit, whereby, upon the circuit receiving wave form (*d*) of Fig. 3 through coupling condenser $C_3$, wave forms indicated by (*e*) and (*e'*) are respectively applied to the control grids of the triodes $VA_2$ and $VA_3$, via coupling condensers $C_4$ and $C_5$. The triodes $VA_2$ and $VA_3$ are arranged as cathode followers and may feed directly into the rectifiers $RE_1$ and $RE'_1$.

From the cathode of the triode $VA_2$, a connection leads to the control grid of the triode $VA_4$ in circuit G, which triode is provided with negative feedback by way of the non-decoupled cathode resistor $R_4$. The wave form, shown at (*e*) applied at the grid of $VA_2$, will be found practically unchanged at the grid of $VA_4$, but it will be amplified and reversed at the plate of this latter tube, as shown at (*f*). From there, it passes to the control grid of triode $VA_5$, via coupling condenser $C_6$. This latter triode is arranged as a cathode follower, and its cathode is connected to the cathode of the rectifier $RE'_2$. Normally, the potential at the cathode of $VA_5$ is sufficiently high to prevent rectifier $RE'_2$ from becoming conductive, and it is also higher than the potential which prevails at the cathode of $VA_3$ in the absence of an input at the grid of this latter tube. The leading edge of the negative amplified pulse, shown at (*f*), will be able to cause the cathode potential of $VA_5$ to drop abruptly, since for such a voltage change at the grid of $VA_5$, rectifier $RE_3$, in shunt with resistor $R_5$, connected between said grid and the positive pole of a D. C. bias source decoupled by condenser $C_7$, will constitute a high impedance. Therefore, at times $t_1$ and $t_3$, it is clear that the high conductivity of rectifier $RE'_2$ will not permit a voltage to remain established across condenser $C'_1$, as clearly shown at (*g'*) in Fig. 3. Circuit G' is, of course, identical to G, and the waveform at (*f'*) corresponds to that at (*f*).

It will be remarked that, if the interval between one current reversal and the next (Fig. 3*a*) is kept below a maximum value, e. g. in the ways disclosed in the above mentioned copending patent application, the storage circuits, such as condenser $C_1$, will not be able to discharge appreciably. Ideally, of course, there is no discharge until the rectifier, such as $RE'_1$ is made conductive, but its backward resistance is finite and the input resistance of CLI, although very high, is finite also. Therefore, there is a slight discharge, but when the time interval between reversals is kept below a maximum much lower than the high discharge time constant at that time, spurious signals will remain masked.

While the principles of the invention have been described above in connection with specific apparatus, it is to be clearly understood that this description is made only by way of example and not as a limitation on the scope of the invention.

What is claimed is:

1. A receiving circuit arrangement for an electrical waveform alternately exhibiting positive and negative variation about a predetermined level, comprising a first channel accepting only said positive variations and a second channel accepting only said negative variations, a storage circuit with a short time constant with respect to the minimum time duration of any positive or negative variation inserted serially in each of said channels, each storage circuit having a charging path and a discharging path, and means interconnecting the charging path of each storage circuit with the discharging path of the other and responsive to a variation at said charging path for causing the discharge of the other storage circuit.

2. A receiving circuit arrangement, as claimed in claim 1, in which the interconnecting means constitutes a two-electrical-condition device with two inputs and two outputs.

3. A receiving circuit arrangement, as claimed in claim 1, wherein the storage circuits each comprise a series rectifier and a shunt condenser, a second rectifier in shunt across each condenser connected to the interconnecting means and adapted to change from a low conductivity state to a high one upon said means receiving a variation at the charging path of the storage circuit formed by the other condenser.

4. Receiving circuit arrangement, as claimed in claim 3, that the time interval between successive variations is very low with respect to the discharge time constant of said shunt condenser in parallel with its associated shunt rectifier in its non-conductive condition and with any other output impedance branched across said condenser.

References Cited in the file of this patent

UNITED STATES PATENTS

| | | |
|---|---|---|
| 2,484,352 | Miller | Oct. 11, 1949 |
| 2,633,564 | Fleming | Mar. 31, 1953 |